May 2, 1950        H. A. WHITIN        2,506,258
ELECTROMECHANICAL WEFT DETECTOR
Filed Feb. 3, 1948        2 Sheets-Sheet 1
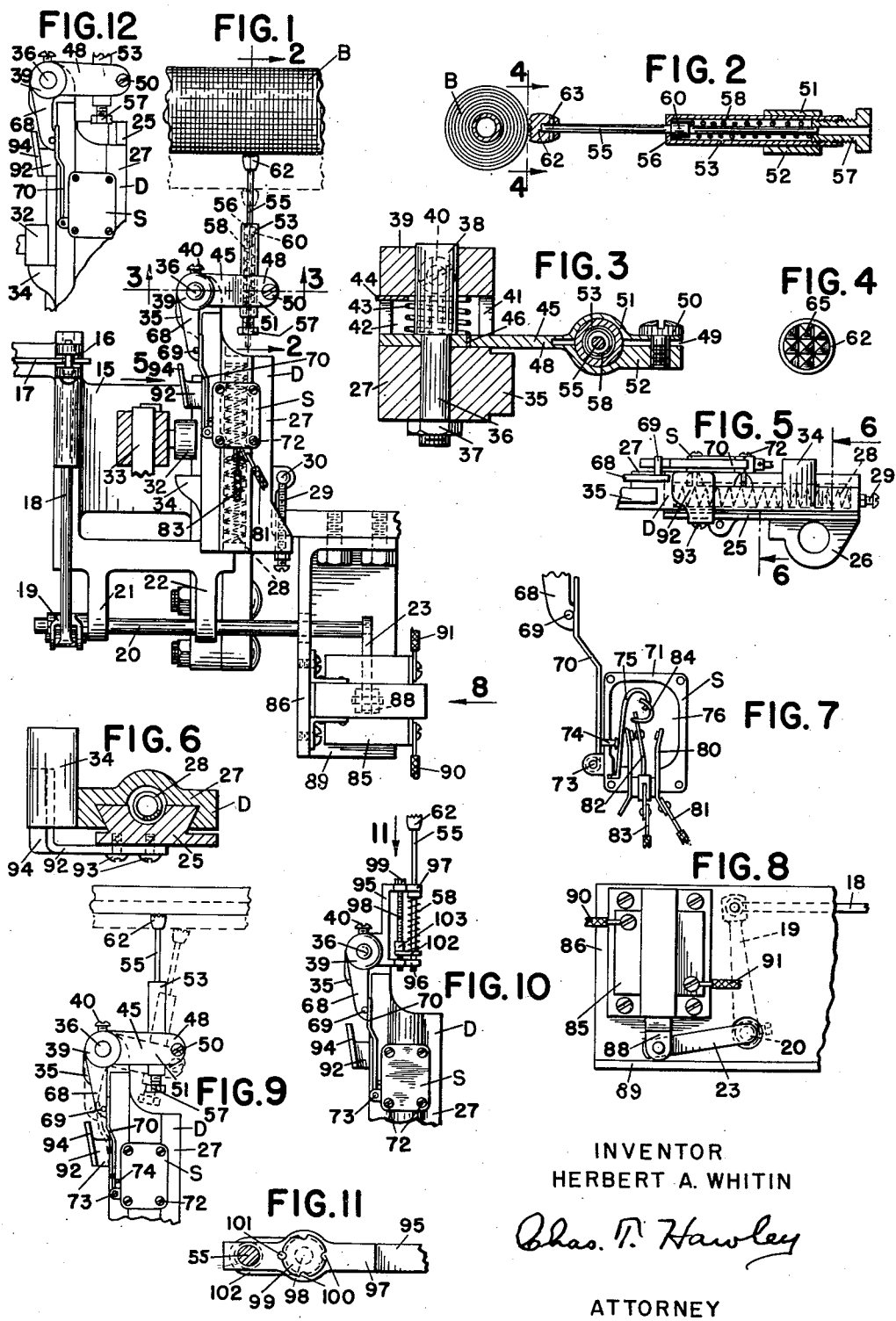
INVENTOR
HERBERT A. WHITIN
Chas. T. Hawley
ATTORNEY May 2, 1950 H. A. WHITIN 2,506,258
ELECTROMECHANICAL WEFT DETECTOR
Filed Feb. 3, 1948 2 Sheets-Sheet 2
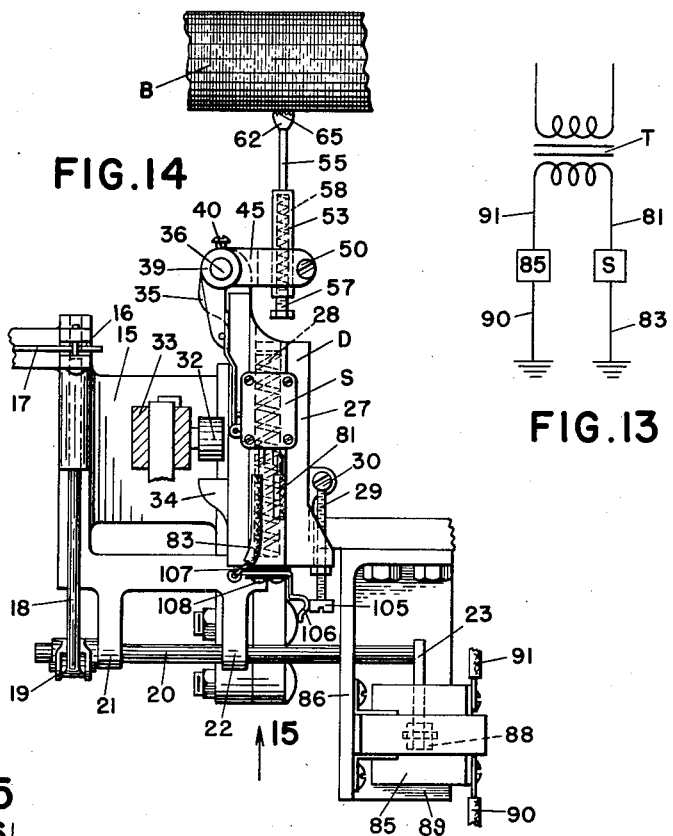
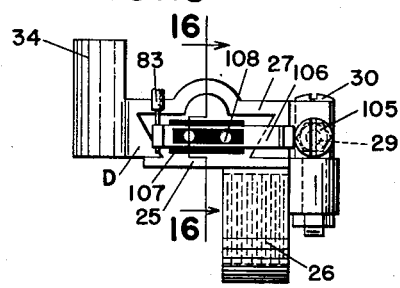
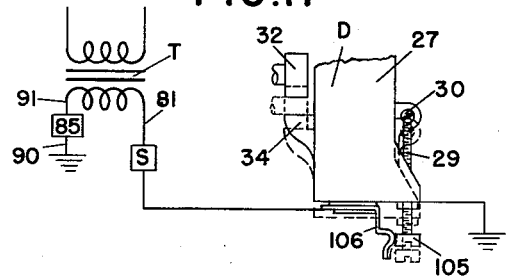
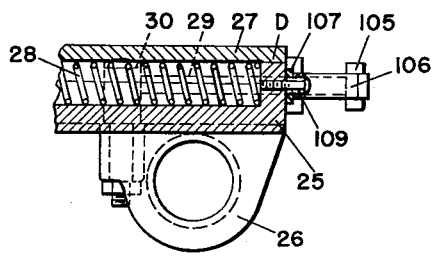
INVENTOR
HERBERT A. WHITIN
Chas. T. Hawley
ATTORNEY Patented May 2, 1950

2,506,258

UNITED STATES PATENT OFFICE 2,506,258

ELECTROMECHANICAL WEFT DETECTOR

Herbert A. Whitin, Worcester, Mass., assignor to Crompton & Knowles Loom Works, Worcester, Mass., a corporation of Massachusetts Application February 3, 1948, Serial No. 6,050

9 Claims. (Cl. 139—273)

This invention relates to improvements in electromechanical weft detectors for weft replenishing looms and it is the general object of the invention to provide a weft detector of this type more particularly adaptable for use with very fine weft.

Weft detectors for fine artificial yarns must be sensitive and sufficiently delicate in their operation to avoid yarn abrasion. In many instances this result is obtained by the use of electric weft detectors requiring a complement of bobbins provided with expensive metallic ferrules. Sensitive side slipping weft detectors have also been developed, but they have ordinarily given their indication mechanically in such a way as to require the exertion of sufficient force to injure delicate wefts.

It is an important object of the present invention to provide a weft detector having a side slipping detector finger to permit use with non-ferrule bobbins coupled with an electric circuit wherein the force required for utilizing the indication of the weft detector is accomplished electro-magnetically rather than by a force derived from the detector.

It is desirable to be able to adjust the tension of the weft detector with respect to the contact member of an electric switch associated with the electric weft detector. The switch will ordinarily have a yieldable member which is held in its normal position by a constant non-adjustable spring which must be overcome as the detector finger slips laterally when giving indication of weft exhaustion. The force of the switch spring may vary from switch to switch and it is desirable to compensate for this variation so that the net force exerted on the detector finger shall be the minimum required to return it to its detecting position. To accomplish this result it is a further object of the invention to provide an adjustable spring opposed to the constant spring of the switch so that it may be set to overcome the force of the switch spring by a small amount just sufficient to move the detector finger back to detecting position after it has had a side slipping movement.

It is also desirable to be able to adjust the distance between the weft detector tip and its pivot and to accomplish this result it is a further object of the invention to make the detector in the form of a wire or the like slidable within a tube adjustably held on one arm of a detector lever.

When the detector is made with the aforesaid wire and tube there is likelihood that the wire will rotate with respect to the tube and change the angular position of the detector tip. Since the latter must in all of its angular positions be capable of effecting some penetration of the weft on the bobbin it is a further object of the invention to provide the detector tip with a set of points rather than the usual ridges so that the points when penetrating a sufficient supply of weft will prevent side slipping regardless of the angular position of the tip.

In order that the detector finger and its switch may be assembled as a unit for use in the types of weft replenishing looms in which the detector is at the replenishing end of the loom, it is a further object of the invention to mount the switch and detector finger on a slide member normally held in rear detecting position but movable forwardly at the time of bobbin transfer to clear the path of the incoming reserve bobbin.

When a side slip weft detector is used at the replenishing end of a loom and is moved forwardly at transfer there is danger that a false or repeated indication of exhaustion will be given resulting from swinging of the detector around its pivot. It is a still further object of the invention to prevent closure of the detecting circuit when the detector is moved forwardly on replenishing beats of the loom.

With these and other objects in view which will appear as the description proceeds, my invention resides in the combination and arrangement of parts hereinafter described and set forth.

In the accompanying drawings, wherein three forms of the invention are shown,

Fig. 1 is a plan view of the preferred form of the invention,

Figs. 2 and 3 are enlarged vertical sections on lines 2—2 and 3—3, respectively, of Fig. 1, Fig. 4 is an enlarged rear view of the weft detector tip as viewed along the line 4—4, Fig. 2, Fig. 5 is a partial side elevation looking in the direction of arrow 5, Fig. 1, Fig. 6 is an enlarged transverse section on line 6—6 of Fig. 5, Fig. 7 is a detail view showing the interior of the electric switch used with the detector, Fig. 8 is a detailed side elevation looking in the direction of arrow 8, Fig. 1, Fig. 9 is a diagrammatic view showing the weft detector in detecting but non-indicating position in full lines and in indicating position in dotted lines, Fig. 10 is a view similar to a portion of Fig. 1 showing a modified form of the invention, Fig. 11 is a rear elevation on an enlarged scale looking in the direction of arrow 11, Fig. 10, Fig. 12 is a diagrammatic view showing the manner in which accidental side slipping of the detector finger is prevented when moved forwardly at the time of bobbin transfer, Fig. 13 shows the electric circuit for the detector, Fig. 14, similar to Fig. 1, shows the second modification, Fig. 15 is an enlarged front elevation in the direction of arrow 15, Fig. 14, Fig. 16 is a vertical section on line 16—16, Fig. 15, and Fig. 17 shows the electric circuit for the second form.

Referring more particularly to Fig. 1, a stationary supporting base 15 generally made of cast iron is formed with a slot 16 in which extends the right end of a control lever 17 of the type commonly used in multicolor weft replenishing looms. The end of lever 17 shown in Fig. 1 has a downward movement of alternate beats of the loom when the lay is at front center and the bobbin B being detected is at the weft replenishing side of the loom. Ordinarily this downward movement is free and uninterrupted, but when a depleted supply of weft is being detected a controller pin or rod 18 normally out of the path of lever 17 is moved under the latter to prevent the normal downward movement of its right end. The other end of lever 17 not shown is thereupon depressed to effect indication of weft exhaustion and initiation of a replenishing operation by means not shown but well understood.

Pin 18 is pivoted to the upper end of a small arm 19 secured to a shaft 20 which is rockable in arms 21 and 22 extending forwardly from the supporting base 15. Shaft 20 extends to the right as viewed in Fig. 1 and has secured thereto a second short arm 23 differing somewhat from that ordinarily used when a mechanical weft detector is employed on multicolor weft replenishing looms, but serving the same general purpose.

The weft detector which, generally designated at D, comprises a stationary base 25 having a depending lug 26 by which the detector is mounted on the support 15. The base is formed as shown in Fig. 6 and guides a slide member 27. A compression spring 28 between the base 25 and slide 27 urges the latter rearwardly and a stop screw 29 on the slide member 27 engages a stationary pin 30 on the base member 25 to limit rearward movement of member 27. The latter is movable forwardly against the action of the spring at the time of a weft replenishing operation by means of a roll 32 carried by the transferrer mechanism designated generally at 33. This roll engages a lug 34 extending laterally from the member 27 and moves the detector finger to be described out of the path of the incoming bobbin. Extending rearwardly from slide member 27 is an arm 35 formed with an upstanding stud 36 held in angularly adjusted position on arm 35 by a lock nut 37, see Fig. 3. The upper enlarged end 38 of stud 36 has collar 39 held in angularly adjustable position thereon by a set screw 40. This collar 39 is provided with downwardly extending slots 41 and is hollow as at 42 to receive a torsion spring 43 one end of which extends as at 44 through one of the slots 41.

Except as noted hereinafter, particularly with reference to arm 23, the matter thus far described is of common construction and may be made as constructed heretofore.

In carrying the preferred form of my invention into effect I pivot a detector lever 45 on stud 36 and attach it to the other end 46 of spring 43. Spring 43 tends to turn lever 45 in a counterclockwise direction as viewed in Fig. 1, but permits it to rock in a clockwise direction. Lever 45 has an arm 48 extending laterally from the stud 36 in a direction more or less parallel to the bobbin B being detected. Arm 48 is split as at 49 and a clamping screw 50 draws the upper and lower parts 51 and 52 of the lever against a tube 53 to hold the latter in adjusted longitudinal position on the arm 48.

The tube supports a detector wire 55 slidable in a bearing 56 at the rear of the tube and in a screw 57 threaded into the forward end of the tube. A light compression spring 58 surrounds that part of the wire 55 within the tube and bears rearwardly against a shoulder 60 rigid with the wire 55. By adjusting the screw 57 in and out of the tube the force exerted rearwardly by spring 58 on the shoulder 60 can be varied.

The rear end of rod or wire 55 is provided with a tip 62 which is rigidly attached to the wire, as by means of a pin 63 shown in Fig. 2. This tip may be made of hardened fiber, a plastic, or metal, and its rear face is provided with a number of points 65, see Fig. 4. These points are distributed over the rear surface of the tip 62 and penetrate the weft being detected if sufficient weft for continued weaving is present. Points 65 replace the ridges customarily employed in those types of weft detectors in which the tip does not rotate. In the present instance, however, wire 55 is free to turn relatively to its supporting tube 53 and the several points will therefore always resist side movement of the tip if sufficient weft is present regardless of the angular position of the tip.

The detector lever 45 is provided with a second arm 68 extending forwardly from the stud 36 and provided with an upright pin 69 which engages an operating arm 70 of an electric switch designated generally at S and shown more particularly in Fig. 7. This switch comprises a body of insulating material 71 which is secured to the top of slide member 27 by means of screws 72. Arm 70 has a pivotal connection 73 with respect to the base 71 and operates a small plunger 74 extending into base 71 to engage a leaf spring 75 located in a chamber 76 within the base of the switch S. This spring 75 normally tends to move the operating arm 70 to the left as viewed in Fig. 7 and therefore normally tries to rock the detector lever 45 in a clockwise direction as viewed in Fig. 1. This tendency, however, is overpowered by the spring 43, and the set screw 40 permits an adjustment of the force exerted by the torsion spring 43. This force will ordinarily be only slightly more than that required to overpower the force of spring 75 and the latter will normally be in the position shown in Fig. 7.

Switch S is provided with an electrode 80 connected to a wire 81 and a second electrode 82 which is flexible and connected to wire 83. This latter electrode is connected by a U-shaped clip 84 to the spring 75. The two electrodes 80 and 82 are insulated from each other and when the parts are in the normal non-contacting position shown in Fig. 7 corresponding to non-indication of the weft detector electrode 82 will be spaced from electrode 80. When, however, the condition of weft on the bobbin permits slippage of the tip 62 along the bare bobbin, lever 45 will rock from the full line to the dotted line position of Fig. 9 and pin 69 will move to the left. This permits operating arm 70 to move to the left, whereupon plunger 74 also moves to the left and spring 75, being free to act, snaps electrode 82 to the right, Fig. 7, to engage electrode 80, thereby electrically connecting wires 81 and 83.

After the detecting operation is completed and the bobbin B moves rearwardly in the normal operation of the loom spring 43 will again overpower spring 75 and the electrodes will return to the position shown in Fig. 7.

Electric connection of the wires 81 and 83 may be utilized to initiate a weft replenishing operation electro-magnetically in any one of several ways. As shown herein a solenoid 85 secured to a bracket 86 fastened to and projecting forwardly from the base 15 has a core 88 normally in down position and connected to the previously mentioned small arm 23 secured to shaft 20. When the solenoid is energized as a result of closure of switch S the core is raised and rocks shaft 20 in such a direction as to move the controller pin 18 rearwardly under lever 17. The solenoid is provided with wires 90 and 91 which may be connected to any appropriate form of electric circuit controlled by the switch S and electrically powered to energize the solenoid when the switch is closed, see Fig. 13.

While I have shown a particular form of solenoid and loom controlling part I do not wish to be thus limited, since so far as certain features of my invention are concerned it will be sufficient if closure of switch S energizes any form of electro-magnetic device which will initiate weft replenishment. The tube 53, lever 45, and switch S are all supported by and move with the member 27 as a unit during forward movement of the detector D by roll 32 during a weft replenishing operation. Core 88 rests on shelf 89 of bracket 86 and by its weight returns pin 18 to forward position, after an indication of weft exhaustion is given.

Movement of slide 27 by roll 32 incident to a weft replenishing operation may cause rocking of lever 45 about its axis with consequent false and undesired closure of switch S. To prevent this closure of the switch I provide a guard 92 secured to the under side of base 25 as at 93, see Fig. 6. This guard has a vertical preferably oblique plate 94 behind roll 32 but forward of arm 68 of lever 45 when slide member is in its normal rear position. Member 27 remains in rear position when the detector indicates and plate 94 does not interfere with arm 68. When the slide is moved forwardly by roll 32, however, lever arm 68 is prevented from moving laterally and pin 69 prevents arm 70 from moving to the left. Switch S is therefore not closed and a false indication is avoided. Fig. 12 shows arm 68 in the forward position it assumes on a replenishing beat of the loom and also shows plate 94 in position to prevent substantial rocking of lever 45.

In the modified form of the invention shown in Figs. 10 and 11 the greater part of the structure thus far described is utilized, but in place of the lever 45 I employ a detector lever 95 having front and back laterally extending arms 96 and 97 in which the detector wire 55 is slidably mounted. The tube is omitted, but the light compression spring 58 tends normally to hold the detector 62 in rear detecting position. In order that tension of the spring 58 may be varied I provide an adjusting screw 98 rotatable in the arms 96 and 97 with a head 99 notched as at 100 to receive a pin 101 secured in arm 97 to hold angular adjustments of screw 98. A clip 102 through which detector wire 55 passes has a hub 103 screw threaded on screw 98 to move back and forth along the latter as it is turned. The compression of spring 58 can therefore be varied to adjust the rearward force exerted by tip 62 against the weft being detected.

As already stated it is necessary to prevent closure of the detector circuit at the time of replenishment. In the invention this is accomplished by mechanical engagement of guard or stop 92 with lever 45 as the latter tends to swing on its pivot incident to the forward and backward reciprocation of slide 27. In the second modification of the invention lever 45 is permitted to swing with resultant closure of switch S, but electrical means prevent closure of the detector circuit at weft replenishment.

The adjusting screw 29 is provided at its front end with a head 105 by means of which the back and forth position of the slide 27 may be adjusted. The rear end of screw 29 engages the stationary stud 30, hence the head 105 is always in the same position regardless of the back and forth adjusted position of the slide 27. A leaf spring 106 is mounted on the base 25 but insulated therefrom by means of a block of insulation 107 and screws 108 which have insulating bushings 109, as shown in Fig. 16. The switch 106 is stationary and when the detector slide 27 is in its normal rearward position engages head 105, which serves as a grounded contact.

Under normal detecting conditions for this second modification the circuit as shown in Fig. 17 will normally be open due to the fact that switch S is open, but the contacts 105 and 106 will be closed. When the lever 45 swings to indicate weft exhaustion the slide support 27 remains in rear position as already described for the preferred form of the invention and the circuit will be closed through the switch S, contacts 105 and 106, the transformer T and the solenoid 85 to initiate a weft replenishing operation of the loom. When the latter occurs roll 32 will move forwardly against lug 34 and the slide 27 will advance, but in doing so the contact head 105 will move forwardly to the dotted line position shown in Fig. 17 and be out of engagement with the spring contact 106. Should detector lever 45 swing under these conditions and close switch S there will be no closure of the detector circuit and a false indication will be avoided.

From the foregoing it will be seen that I have provided a simple form of electro-mechanical weft detector wherein the detector lever 45 is acted upon by a relatively strong adjustable spring which overpowers a weaker spring 75 within the switch S. Springs 58 and 75 are collectively stronger than spring 43, and spring 58 has a strength greater than the difference in the strengths of springs 43 and 75. It will also be seen that the normally open switch S and detector arm 45 are both mounted on the slide support or member 27 to form a unit movable forwardly on stand or base 25 by roll 32. Also, the tube 53 is adjustable longitudinally in arm 48 along an axis at one side of stud 36 by reason of the clamp screw 50 of lever 45, thereby permitting an adjustment in the distance between stud 36 and the detector tip 62. This adjustment also permits a variation in the angle of the line joining the stud 36 and tip 62 relatively to the surface being detected. The tip 62 is provided with a rear surface comprising a series of weft penetrating points which effectively prevent side slipping of the detector for all angular positions of the tip when sufficient weft for continued weaving is present on the bobbin B. Furthermore, the compression of the spring acting on the wire 55 can be varied either by the screw 57 in the preferred form, or by the adjusting screw member 98 and the stop 102 in the modified form. Furthermore, stop or guard 92 prevents objectionable swinging of detector arm 45 when roll 32 effects forward and backward reciprocation of slide member 27. In the form of the invention shown in Figs. 14 to 17 a loom controlling circuit has the switch S in series with contacts normally closed when member 27 is in rear position, but the circuit is opened by separation of the contacts when member 27 moves to a forward position on weft replenishing beats of the loom.

Having thus described my invention it will be seen that changes and modifications may be made therein by those skilled in the art without departing from the spirit and scope of the invention, and I do not wish to be limited to the details herein disclosed, but what I claim is:

1. In an electro-mechanical weft detecting mechanism for a loom having a support, a weft detector lever pivoted on the support and having two arms, a spring holding the lever in normal detecting position, a weft detector on one arm having a side slipping motion and turning the lever against the action of said spring when indicating weft exhaustion, a normally open electric switch having a spring operatively engaging the other arm and opposing the first spring and tending to close the switch but normally prevented from doing so by the first spring, and adjusting means to vary the force exerted by the first spring on said lever, said detector when indicating weft exhaustion overpowering the first spring and enabling the second spring to close said switch.

2. In an electro-mechanical weft detecting mechanism for a loom having a support, a weft detector lever pivoted on the support, a spring holding the lever in normal detecting position, a weft detector on said lever having a side slipping motion and turning the lever when indicating weft exhaustion, a normally open electric switch having a spring operatively engaging the lever and opposing the first spring, and adjusting means to vary the force exerted by the first spring on said lever, said first spring being stronger than the second spring and normally overpowering the latter to maintain the switch normally open, said lever when turning due to indication of weft exhaustion overpowering the first spring and enabling the second spring to close said switch.

3. In a side slipping weft detector for a bobbin in a weft replenishing loom, a pivotal support, a lever on the support, a relatively strong spring resisting turning of the lever on the support in a direction to indicate weft exhaustion, a normally open electric switch having a second spring weaker than but opposing the first spring and tending to turn the lever in a direction to indicate weft exhaustion and close said switch, a weft detector element slidably mounted forwardly on the lever along a line offset laterally from the support in the direction of the length of the bobbin, a third spring stronger than the difference in the strengths of the first and second named springs urging the member rearwardly along said line but yieldable forwardly when the detector engages a sufficient supply of weft, said second and third springs effective to cause turning of the lever in a direction to indicate weft exhaustion against the action of the first spring when the bobbin is depleted of weft and engages the detector element.

4. In a loom electro-mechanical weft detector having a support which is moved forwardly from the normal rear position thereof to a given forward position on replenishing beats of the loom, a side slipping weft detector pivoted on the support and moving laterally relatively to the support when indicating weft exhaustion, a normally open electric switch on the support, operative connections on the support between the detector and switch closing the latter when the support is in the normal rear position thereof and the detector moves laterally to indicate weft exhaustion, and means preventing lateral movement of the detector when the support is in said given forward position.

5. In an electric weft detector for a loom, a side slipping weft detector which moves angularly when indicating weft exhaustion, a slide member pivotally supporting the weft detector, normally open electric circuit means closed by the weft detector when the latter indicates weft exhaustion, means causing a reciprocating movement of the slide on a weft replenishing beat of the loom and tending to cause said weft detector to indicate weft exhaustion during said movement, and means preventing closure of said circuit means during said reciprocating movement of said slide.

6. In an electric weft detector for a bobbin, a slide having a forward and backward reciprocation on weft replenishing beats of the loom, a normally open electric contact, a side slipping weft detector element on the slide tending to close said electric contact when the slide has said reciprocation, electric circuit means controlling loom operation including said contact and normally open but closed when the detector indicates weft exhaustion, and means preventing closure of said circuit means when the slide reciprocates.

7. In an electric weft detector for a loom, a member normally in rear position but movable to a forward position, a weft detector on the member capable of indicating weft exhaustion when the member is in rear position, an electric switch closed when the detector indicates weft exhaustion, a pair of contacts normally engaging each other when the member is in normal rear position but separating when the member moves to forward position, and electric circuit means having said switch and contacts in series and capable of closure by said switch when the member is in rear position but incapable of closure by said switch when the member is in forward position.

8. In an electric weft detector for a loom, a member movable from a normal rear position to a forward position on weft replenishing beats of the loom, a weft detector on the member capable of indicating weft exhaustion when the member is in normal rear position, an electric switch closed when the detector indicates weft exhaustion, a stationary contact, a contact moving with the member and engaging the stationary contact when the member is in normal rear position but incapable of engaging the stationary contact when the member is in forward position, and loom controlling electric circuit means having said switch and contacts in series and capable of closure by the switch when the member is in rear position but incapable of closure when the member is in forward position.

9. In an electric weft detector for a loom, a stationary stand, a member slidable forwardly and backwardly on the stand, a stop on the stand, an adjusting screw on the member engaging the stop to adjust the rearward position of the member on the stand, the member being normally in a rearward position on the stand but movable thereon to a forward position on weft replenishing beats of the loom, an electric switch closed upon indication of weft exhaustion when the member is in rear position, a contact normally electrically engaging the adjusting screw when the member is in rearward position but incapable of engaging the screw when the member is in forward position, and loom controlling electric circuit means having the switch, contact and screw in series and capable of closure when the member is in rear position but incapable of closure when the member is in forward position, said screw and contact engaging each other for all adjusted positions of the member relatively to the stand when the screw engages said stop.

HERBERT A. WHITIN.

REFERENCES CITED

The following references are of record in the file of this patent:

UNITED STATES PATENTS

| Number | Name | Date |
|---|---|---|
| 1,316,060 | Quinton | Sept. 16, 1919 |
| 1,766,821 | Holmes | June 24, 1930 |
| 1,790,214 | Hollins | Jan. 27, 1931 |
| 1,791,557 | Dodge | Feb. 10, 1931 |
| 2,023,705 | Smith | Dec. 10, 1935 |
| 2,033,003 | Payne | Mar. 3, 1936 |